(Model.)
W. H. HALLADAY.
SAW SHARPENING MACHINE.
No. 254,869. Patented Mar. 14, 1882.
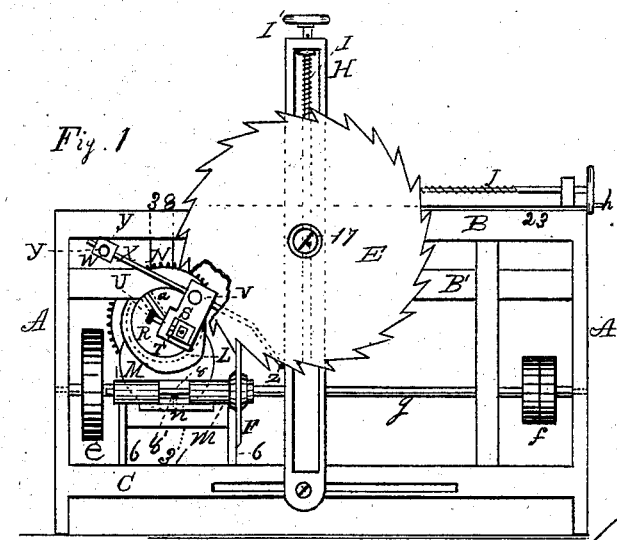
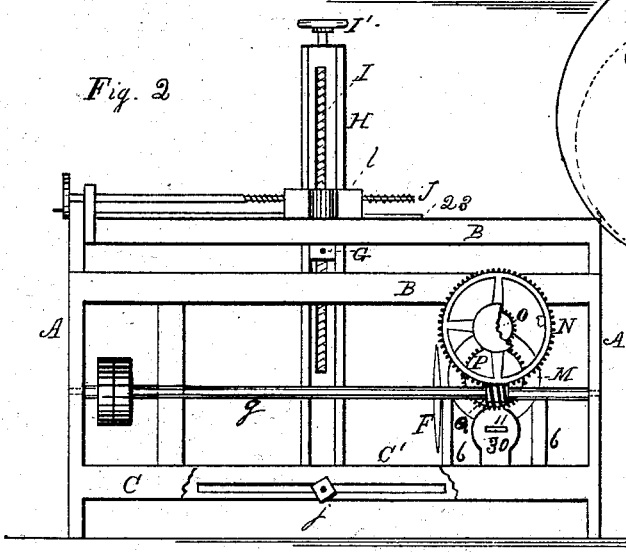
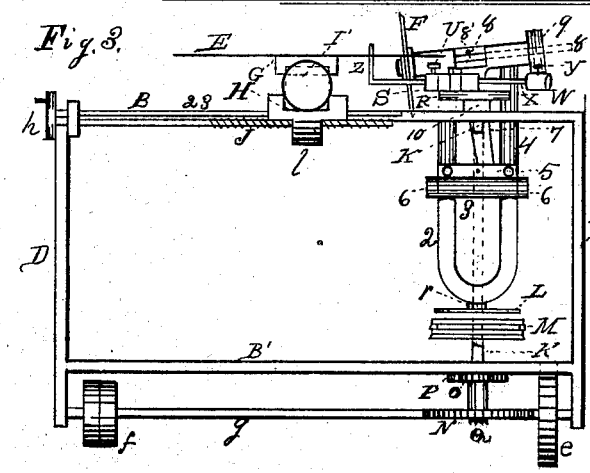
Witnesses
A. M. Leech
Chas. Beck
Inventor
William H. Halladay
By G. L. Chapin
Atty.
2 Sheets—Sheet 1.

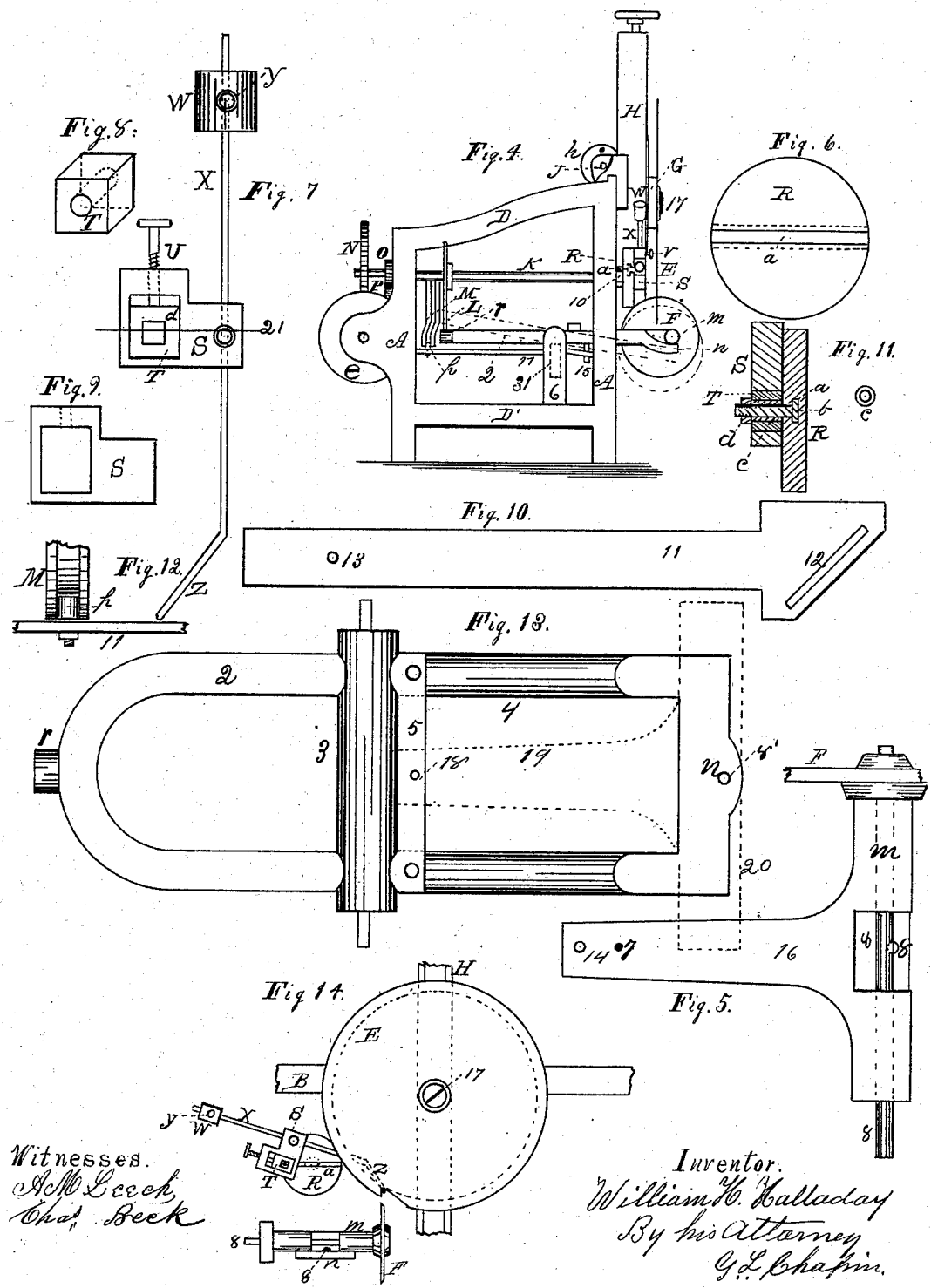

UNITED STATES PATENT OFFICE.

WILLIAM H. HALLADAY, OF CHICAGO, ILLINOIS, ASSIGNOR OF ONE-HALF TO EDWIN BENJAMIN, JASPER E. MALLERY, AND ENGLEBERT FISCHER, ALL OF SAME PLACE.

SAW-SHARPENING MACHINE.

SPECIFICATION forming part of Letters Patent No. 254,869, dated March 14, 1882.

Application filed May 23, 1881. (Model.)

*To all whom it may concern:*

Be it known that I, WILLIAM H. HALLADAY, of Chicago, county of Cook, and State of Illinois, have invented a new and useful Improvement in Automatic Saw-Sharpeners, of which the following is a specification, reference being had to the accompanying drawings, illustrating the improvement, in which—

Figure 1, Sheet 1, is a longitudinal face elevation of a mechanism embodying my invention and improvement; Fig. 2, a view of the opposite side of the machine shown at Fig. 1, with the saw and some portion of the mechanism omitted to show other parts more clearly. Fig. 3 is a top or plan view of Fig. 1. Fig. 4, Sheet 2, is an end elevation of Fig. 1, Sheet 1; Fig. 5, Sheet 2, a top or plan view of the oscillating support for the grinding-wheel removed from its tilting frame; Fig. 6, a face view of the feed-wheel enlarged about three diameters of the same part in some of the other figures. Figs. 7, 8, and 9 represent different parts of the mechanism which operates in combination with the feed-wheel to bring the saw-teeth properly to the grinding-wheel, also enlarged; Fig. 10, a top or plan view of the reciprocating guide-bar enlarged and removed from the other parts; Fig. 14, a face view of a part of the same mechanism shown at Fig. 1, but in position as when the tilting frame has been depressed at its front end to allow a tooth to be moved forward by the feed devices; Fig. 11, a section of the feed-wheel and a portion of the feed attachments, taken on line 21, Fig. 7; Fig. 12, a broken edge elevation of the reciprocating guide-bar, a broken edge elevation of the lower portion of the grooved cam-wheel which operates the bar, and an elevation of the anti-friction roller which is placed in the groove; Fig. 13, a plan view of the tilting frame which supports the oscillating support of the grinding-wheel, enlarged about three sizes.

The object of the present invention is to provide simple, more durable, and effectual means for automatically sharpening saws by means of grinding-wheels.

The nature of the invention consists—

First. In an oscillating device which operates with a tilting frame to bevel the edges of the saw-teeth during the sharpening process.

Second. In the combination of feed mechanism with the mechanism for adjusting the saw to the grinding-wheel, whereby the adjusting can be done when the device is in operation.

Third. In the combination of the grinding-wheel with a suitable adjusting and operating support placed below the axis of the saw, whereby the machine operates steadier and the sparks from the grinding are so low as to be of much less inconvenience to the operator. A machine constructed in this manner is much stronger than where the grinding-wheel is above.

Fourth. In the combination of a tilting frame with a continuous cam for elevating and depressing it and an oscillating support for the grinding-wheel.

Fifth. In the combination of a reciprocating guide-bar and a rotary cam for operating it with the tilting frame and oscillating support for the grinding-stone, as the whole is hereinafter fully described and shown.

A A represent the legs, B B' the longitudinal top rails, and D D the transverse top rails, of the frame. D' indicates one of two similar lower transverse rails, and C C' are the lower longitudinal rails thereof, all of which in practice I prefer to make of cast-iron and so light as may be and yet give a firm support to the operating mechanism. The rail C' is slotted to admit a screw to be put through the lower end of standard H, and said standard is movable to the right or left, as the case may be, to bring the saw E to the grinding-wheel F. A nut turned on the opposite end of the screw, as shown at *j*, Fig. 2, holds the standard H in place when adjusted.

A guide, *l*, attached to the standard H, is arranged to run on a rib, 23, on the top of rail B by means of a screw-rod, J, which has a nut in the guide *l* for that purpose. The saw is hung to a hub, G, which runs in a groove formed in the standard H, and a screw-rod, I I', passing through the hub, may be turned to elevate or depress the saw.

A tilting frame, 2 3 4 *n*, is hung to bearings 6 6, Figs. 3 and 4, and the rear part of the frame supports an anti-friction roller, r, which is operated on by a continuous cam, L, at the proper time to bring the grinding-wheel F to the saw E. An oscillating guide-support, m 16, is placed on the tilting frame in the position shown by dotted lines 20, Fig. 13, and it is pivoted to that part of the tilting frame as shown at n and at 8', so that the inner end, 19, of the support may swing laterally, as shown at Fig. 3, and thereby bring the grinding-stone F diagonally to the saw, and thereby dress the teeth thereof in beveled forms on their edges.

The grinding-stone is fastened to shaft 8, which runs through the part m of the support, and on the opposite end of the shaft is to be fastened the drive-pulley 9, as shown at Fig. 3.

The means for placing the wheel F in alternate diagonal positions, so as to bevel each alternate tooth in an opposite direction to that of the others, consists of a reciprocating bar, 11, which lies under the tilting frame 2 3 4 n, its rear end having a bearing in a standard, 30, erected for that purpose, as shown at Fig. 2. Its front part has a bearing in a cross-piece, 31, attached to the standards 6 6, and to its rear part is pivoted an anti-friction roller, p, Figs. 4 and 12, which is so operated on by a cam-grooved disk, M, as to give to it a reciprocating movement at the proper intervals to give an oscillating movement to the support 16 m by means of a pin, 15, Fig. 4, which passes through a hole, 7, in the part 16, and through a diagonal slot, 12, in the bar 11, and consequently gives to the support 16 m the position shown at Fig. 3, and in that position it is held till a tooth is ground. Then its position is changed to an oppositely-inclined direction and held there till the next tooth is ground. To attain this end the cam-groove in the periphery of disk M is formed with two opposite lateral bends or curves, so that when the anti-friction roller p is operating in the bent or inclined parts of the cam-groove the bar 11 is moved longitudinally out or back, and when the roller is operating in the straight portion of the cam-groove the bar 11 is stationary, the oscillating support 16 m being operated on by the bar 11 only while the roller p is in the inclined portions of the cam-groove in disk M. The inner end of the support 16 m passes below and is held vertically in place by a bar, 5, attached to parts 4 of the tilting frame, so that it may swing laterally in either direction. The tilting frame 2 4 3 n is depressed, as indicated by dotted lines 2, Fig. 4, Sheet 2, by its own gravity, and it is elevated to bring the grinding-wheel F to the saw-teeth by means of a cam, L, operating on an anti-friction roller, r, pivoted to the inner end of the tilting frame, as shown at Figs. 4 and 13.

A face view of the cam of a size corresponding to Figs. 10 and 13 is shown on Sheet 1 and marked "cam L." The cam L is supported on and driven by a shaft, K, which is supported by frame-pieces 30 and 33 of the machine, and is driven by a gear-wheel, N, on the same shaft K. There is also a pinion, O, on this shaft, which drives a gear, P, below it. This gear P has a shaft bearing in the frame-piece or standard 30, and to the inner end of this shaft is secured the cam-grooved disk M. The gear-wheel N is driven by a screw-gear, Q, on a shaft, g, which has bearings in projection from the legs A A of the frame. f represents a tight and loose pulley on shaft g, to which the power is applied; and e is the pulley on the same shaft which drives pulley 9, and consequently rotates the grinding-stone F. (See Fig. 3.)

The devices for turning the saw automatically to properly bring the saw-teeth successively to the wheel F in conformity with the movement of the frame 2 3 4 n consist of a disk, R, hung to the shaft K outside of the face of the frame, and centrally across the face of which is formed a T-groove, a, as shown at Figs. 1, 6, 4, and 11. A T-slide, b, is fitted to and made fixable in this groove, and its shank, by means of a thimble, c, and nut d, is pivoted to a block, T.

A feed-pawl support, S, is provided with a mortise as wide as the block T, but longer, so that when the pawl-supporting block S is placed on the block T said block may be adjusted (by means of a thumb-screw, U, tapped into the block S, as shown) toward or from the saw. The pawl X is supported by the block S, and is made adjustable therein by means of a set-screw, U, and its lower end, which hooks over the tooth, is held to its work by a weight, W, which is adjustable on the pawl X. The rotation of the wheel R carries the pawl back and forth to bring the saw-teeth to the wheel F. The T-bolt b, when adjusted to the required point in the T-slot a, is held in place by the nut d. By this means the end z of the pawl may have given to it the nicest adjustment when the machine is in operation, so as always to bring a saw-tooth properly to the wheel F at the time the tilting frame brings the wheel F up to its work on the saw. Saw-teeth may be cut square on their edges by removing the bar 11 and securing the inner end, 19, of the support by means of a pin put through the holes 18 14, in which case the cam-disk M is inoperative.

It is proper to observe that a cam formed as shown at L will so elevate the tilting frame 2 3 4 n as to allow the grinding-wheel F to be depressed only so fast that said wheel may in its downward movement dress the long or back edge of the tooth.

I claim and desire to secure by Letters Patent of the United States—

1. The oscillating support 16 m, for giving to the wheel F a diagonal position, in combination with the tilting frame 2 3 4 n, as and for the purpose specified.

2. The combination of the feeding devices for bringing the saw-teeth to the wheel F, consisting of the blocks S T, weighted pawl X, and T-bolt b, substantially as specified.

3. In a saw-sharpener, the grinding-wheel F, combined with suitable operating and adjusting supports 2 3 4 n and 16 m, placed below the axis of the saw, as and for the purpose specified.

4. The tilting frame 2 3 4 n, in combination with a continuous cam, L, and supporting-frame 16 m, and wheel F, with the feed devices S R T X, as and for the purpose specified.

5. The combination of the reciprocating bar 11, tilting frame 2 3 4 n, support 16 m, and wheel F, with the grooved cam M, as and for the purpose specified.

WILLIAM H. HALLADAY.

Witnesses:
G. L. CHAPIN,
ADOLF HEILE.